Patented Jan. 9, 1923.

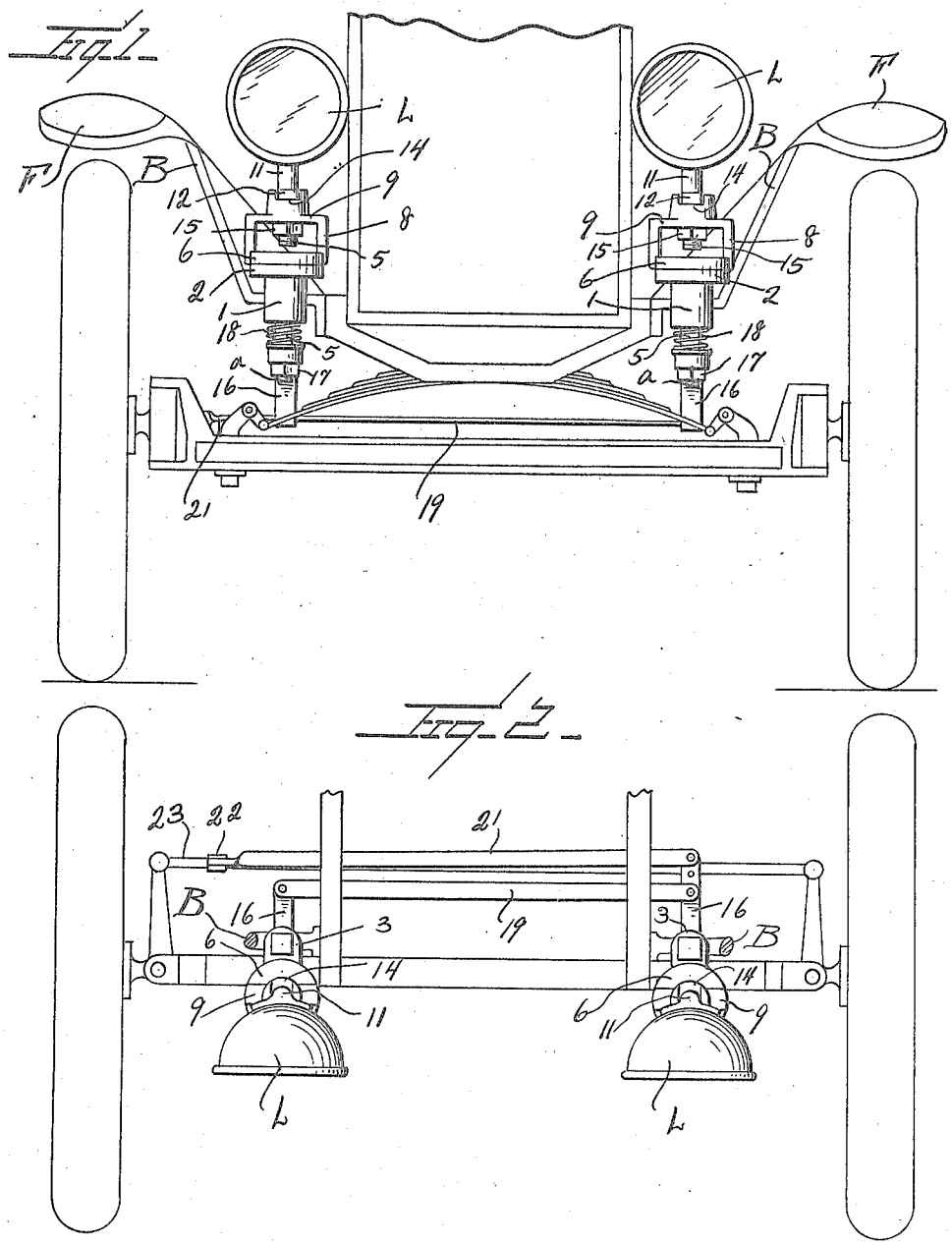

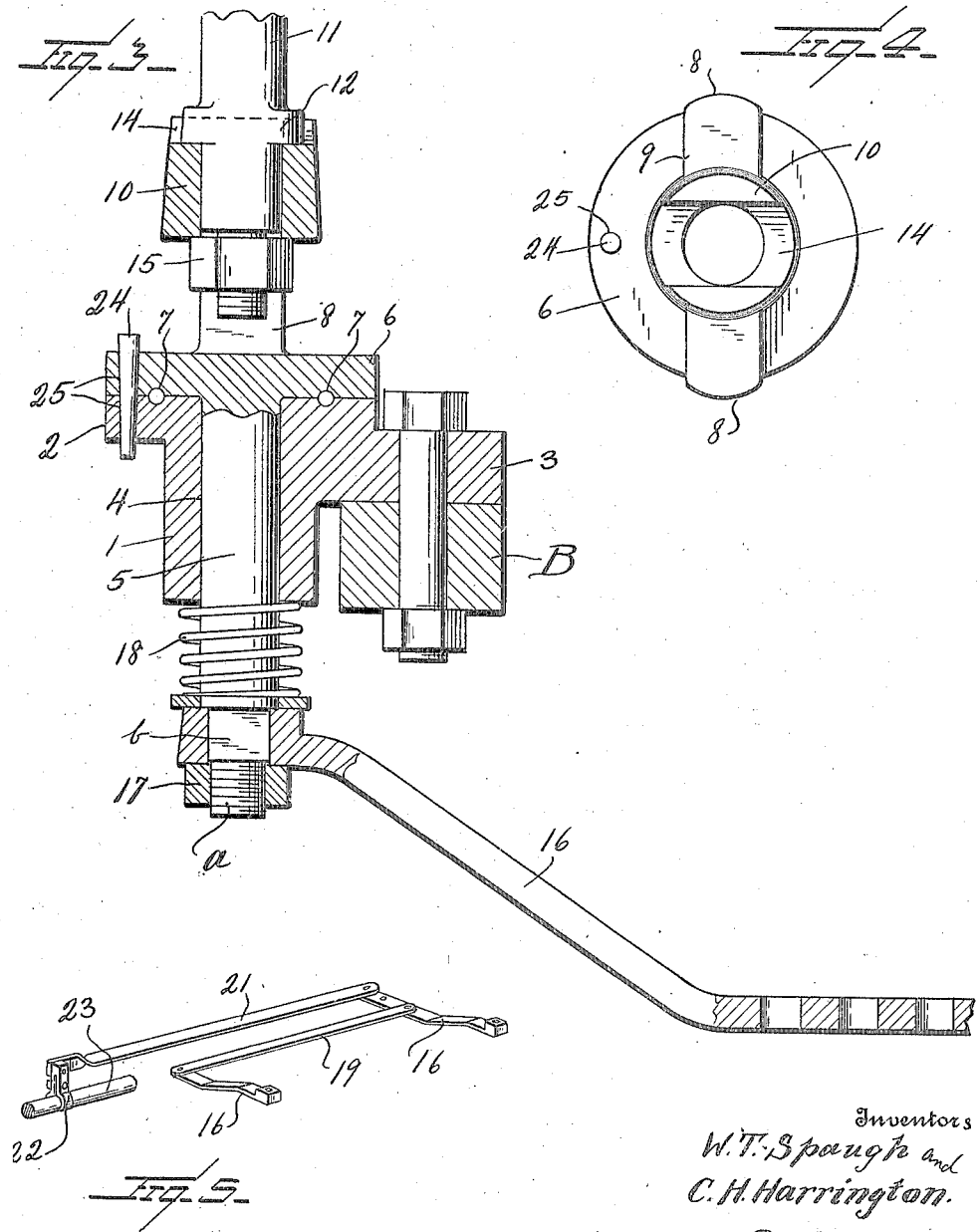

1,441,762

UNITED STATES PATENT OFFICE.

WALTER T. SPAUGH AND CECIL H. HARRINGTON, OF COLUMBUS, GEORGIA.

DIRIGIBLE HEADLIGHT.

Application filed April 5, 1922. Serial No. 549,727.

*To all whom it may concern:*

Be it known that WALTER T. SPAUGH and CECIL H. HARRINGTON, citizens of the United States, residing at Columbus, in the county of Muscogee and State of Georgia, have invented certain new and useful Improvements in Dirigible Headlights, of which the following is a specification, reference being had to the accompanying drawings.

This invention relates to certain improvements in dirigible headlights and has relation more particularly to a device of this character especially designed and adapted for use in connection with automobiles and kindred vehicles and it is an object of the invention to provide a device of this general character embodying novel and improved means whereby a headlight is caused to turn in unison with the steering wheels and in the same general direction so that the roadway in advance of the vehicle may be illuminated during the turning of the vehicle.

Another object of the invention is to provide a dirigible headlight having associated therewith novel and improved mechanism to cause a turning movement of a headlight when the vehicle changes its course of travel and which mechanism is operatively engaged with the steering mechanism of the vehicle.

An additional object of the invention is to provide a dirigible headlight having novel and improved means for mounting the same in applied position whereby rattling of the headlight is prevented and particularly when the vehicle is in transit.

Furthermore, it is an object of the invention to provide a novel and improved headlight adapted to turn in the same general direction as the vehicle to illuminate the roadway in advance of the vehicle together with means whereby said headlight, when desired, may be held against such turning movement or maintained in a straight-ahead position.

The invention consists in the details of constructions and in the combination and arrangement of the several parts of our improved dirigible headlight whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein;

Figure 1 is a view in front elevation illustrating a dirigible headlight constructed in accordance with an embodiment of our invention, Figure 2 is a view in top plan with parts broken away of the structure illustrated in Figure 1, Figure 3 is an enlarged fragmentary view partly in section and partly in elevation illustrating in detail the mounting for a lamp bracket or stem and the parts associated therewith, Figure 4 is a view in top plan of the head carried by the shank, and Figure 5 is a fragmentary view in perspective illustrating the means for causing a plurality of headlights or lamps to move in unison.

As disclosed in the accompanying drawings each of the braces B or a front fender F of a motor vehicle or the like has associated therewith a vertically disposed and relatively short cylindrical or tubular member 1 having its upper end substantially defined by an outstanding continuous flange 2 providing a head. The upper portion of the member 1 also has extending laterally therefrom an arm 3 which is adapted to be bolted or otherwise secured to the brace B. As herein disclosed my invention is shown employed in connection with the well known Ford automobile and an attachment of the arm 3 with the brace B is at the opening provided in the Ford car and with which co-act the lamp post which forms part of the original vehicle.

Insertable through the bore 4 of the member 2 and from above is an elongated shank 5 of a length to extend, when applied, a desired distance below the lower end of the member 1. The upper end portion of the shank 5 is provided with a head 6 which overlies the flange or head 2 hereinbefore referred to. The opposite faces of the heads 2 and 6 are provided with annular grooves 7 which register one with the other and in which a suitable lubricating medium may be applied in order to permit the heads 2 and 6 to have relative turning or rotary movement one with respect to the other with a minimum of frictional resistance. If preferred, however, these registering grooves 7 may be employed as race-ways for anti-friction members of a ball type. Extending upwardly from the head 6 at diametrically opposite points and at the marginal portions thereof are the arms 8 having their upper extremities connected by a cross member 9. The central portion of the cross member 9 is provided with a vertically disposed sleeve 10. Insertable from above, through the sleeve 10, is the lower end portion of a lamp bracket or stem 11. This stem 11 is provided inwardly of its lower end with oppositely directed lugs or outstanding shoulders 12 which seat within the recesses 14 provided in the upper portion of the sleeve 10 whereby the bracket or stem 11 is held against rotation independently of the sleeve 10. Threaded upon the bracket or stem 11 below the sleeve 10 is a clamping nut or member 15 whereby the bracket or stem 11 is effectively secured through the sleeve 10.

The upper portion of the bracket or stem 11 has secured thereto in a conventional manner a headlight or lamp L of any ordinary or preferred type.

The lower end portion of the shank 5 is threaded as at $a$ and the portion immediately thereabove is angular in cross section as at $b$. Engaged with the angular portion $b$ of the shank 5 is a rearwardly directed arm 16, said arm being held in applied position by the nut 17 engaged with the threaded portion $a$.

The heads 2 and 6 are constantly urged one toward the other by an expansible member 18 herein disclosed as a coil spring encircling the stem 5 and interposed between the arm 16 and the lower end of the member 1. The member or spring 18 is of insufficient tension to hold the shank 5 against turning movement yet of such strength to prevent rattling or the like when the vehicle is in transit. The arms 16 of both of the shanks 5 are connected by a rod 19 whereby both of the shanks 5 are caused to rotate in unison and in the same direction.

Also operatively engaged with one of the arms 16 is an end portion of a rod 21, the opposite end portion of said rod 21 being operatively connected with an upstanding post 22 secured to the rod 23 which, in a conventional manner, connects the spindle arms of the front steering wheels.

When the connecting rod 23 is moved as is well known to effect the desired steering movement of the front wheels of the vehicle such movement will be transmitted through the rod 21 to the stems 5, resulting in the lamps L being turned in unison with the steering wheels and in the same general direction so that the roadway in advance of the vehicle will be illuminated during the period such vehicle is making a turn. When it is desired that each of the headlights or lamps 12 shall be maintained against turning movement or in a straight-ahead position, a pin 24, or the like, is disposed through the registering openings 25 carried by the heads 2 and 6. When each of the shanks 5 are locked against rotary or turning movement the rod 21 is disconnected so that the ordinary steering operation for the vehicle will not be hindered or obstructed.

From the foregoing description it is thought to be obvious that a dirigible headlight constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. The combination with a vehicle body and a steering mechanism associated therewith, a vertically disposed tubular member carried by the body, the upper end portion of said end member being provided with an outstanding flange to provide a head, a shank insertable through the member from above and provided with a head overlying the head of the member, said shank being of a length to extend below the tubular member, means co-acting with the lower portion of the shank and the tubular member for constantly urging the said heads one toward the other, upstanding arms carried by the head of the shank, a member connecting said arms and provided with a vertically disposed sleeve, said sleeve being spaced from the head of a shank, a lamp bracket insertable through the second named sleeve, said bracket being provided with outstanding shoulders engaging the upper end of the second named sleeve, a clamping member engaged with the bracket below the sleeve, said sleeve having recesses in which the shoulders seat to connect the bracket and sleeve for unitary rotation, and means operatively engaged with the steering mechanism for rotating the shank.

2. The combination with a vehicle body and a steering mechanism associated therewith, a vertically disposed tubular member carried by the body, the upper end portion of said end member being provided with an outstanding flange to provide a head, a shank insertable through the member from above and provided with a head overlying the head of the member, said shank being of a length to extend below the tubular member, means co-acting with the lower portion of the shank and the tubular member for constantly urging said heads one toward the other, upstanding arms carried by the head of the shank, a member connecting said arms and provided with a vertically disposed sleeve, said sleeve being spaced from the head of a shank, a lamp bracket insertable through the second named sleeve, said bracket being provided with outstanding shoulders engaging the upper end of the second named sleeve, a clamping nut threaded upon the bracket below the second named sleeve and contacting with the lower end of said sleeve to maintain the shoulders of the bracket in contact with the sleeve, said sleeve having recesses in which the shoulders seat to connect the bracket and sleeve for unitary rotation, and means operatively engaged with the steering mechanism for rotating the shank.

In testimony whereof we hereunto affix our signatures.

WALTER T. SPAUGH.
CECIL H. HARRINGTON.